(12) United States Patent
Huang et al.

(10) Patent No.: US 10,493,727 B2
(45) Date of Patent: Dec. 3, 2019

(54) ASSEMBLY ARRANGEMENT SYSTEM AND ASSEMBLY MANUFACTURING METHOD

(71) Applicant: Elite Material Co., Ltd., Taoyuan (TW)

(72) Inventors: Chia-Hui Huang, Taoyuan (TW); Hsing-Lung Li, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 0 days.

(21) Appl. No.: 15/644,176

(22) Filed: Jul. 7, 2017

(65) Prior Publication Data

US 2018/0170011 A1 Jun. 21, 2018

(30) Foreign Application Priority Data

Dec. 19, 2016 (TW) .............................. 105142044 A

(51) Int. Cl.
| | | |
|---|---|---|
| *B32B 15/00* | (2006.01) | |
| *B32B 27/00* | (2006.01) | |
| *H05K 3/00* | (2006.01) | |
| *B32B 39/00* | (2006.01) | |
| *B32B 15/20* | (2006.01) | |
| *B32B 15/08* | (2006.01) | |

(Continued)

(52) U.S. Cl.
CPC .............. *B32B 15/20* (2013.01); *B32B 15/08* (2013.01); *B32B 15/14* (2013.01); *B32B 15/18* (2013.01); *B32B 27/04* (2013.01); *B32B 38/0004* (2013.01); *B32B 2260/02* (2013.01); *Y10T 156/1062* (2015.01); *Y10T 156/1322* (2015.01); *Y10T 156/1746* (2015.01); *Y10T 156/1761* (2015.01); *Y10T 156/1783* (2015.01)

(58) Field of Classification Search
CPC ......... Y10T 156/1062; Y10T 156/1322; Y10T 156/1746; Y10T 156/1761; Y10T 156/1783; B32B 2260/046; B32B 2260/021; B32B 15/20; B32B 15/14; B32B 15/18; B32B 27/04; B32B 38/0004; H05K 3/022
See application file for complete search history.

(56) References Cited

U.S. PATENT DOCUMENTS 4,372,800 A * 2/1983 Oizumi ................... B29C 70/50
156/307.3
6,132,559 A * 10/2000 Haavanlammi ........... D21F 2/00
162/203

(Continued)

*Primary Examiner* — Linda L Gray
(74) *Attorney, Agent, or Firm* — Muncy, Geissler, Olds & Lowe, P.C.

(57) ABSTRACT

Disclosed is an assembly arrangement system, comprising a feeding unit, a conveyor unit and an assembling unit. The feeding unit comprises a supplying part and a cutting part. The supplying part is provided with a prepreg and configured to supply the prepreg to the cutting part. The cutting part cuts the prepreg to continuously form one or more prepreg sheets. The conveyor unit receives and conveys the prepreg sheet. The assembling unit comprises a metal foil supplying part, a first assembling part and a second assembling part. The second assembling part assembles a plate and a metal foil from the metal foil supplying part with the prepreg sheet from the conveyor unit into an assembly, and the first assembling part bears the assembly. Also provided is an assembly manufacturing method.

8 Claims, 5 Drawing Sheets

(51) Int. Cl.
*B32B 15/18* (2006.01)
*B32B 27/04* (2006.01)
*B32B 38/00* (2006.01)
*B32B 15/14* (2006.01)

(56) References Cited

U.S. PATENT DOCUMENTS 8,517,075 B2 * 8/2013 Shantou .................. B31F 5/04
156/521
2011/0159761 A1 * 6/2011 Yang ....................... B32B 15/14
442/180

* cited by examiner

ASSEMBLY ARRANGEMENT SYSTEM AND ASSEMBLY MANUFACTURING METHOD

CROSS-REFERENCE TO RELATED APPLICATION

This application claims the priority benefits of Taiwan Patent Application No. 105142044, filed on Dec. 19, 2016, the entirety of which is incorporated by reference herein and made a part of this specification.

BACKGROUND OF THE INVENTION

1. Field of the Invention

This invention relates to the field of laminate processing technology and more particularly to an assembly arrangement system and an assembly manufacturing method, in which a prepreg is cut into one or more prepreg sheets, followed by assembling a plate, a metal foil and the prepreg sheets directly into an assembly.

2. Description of Related Art

Conventionally, the production of a copper clad laminate (CCL) involves superimposing two copper foils on two sides of at least one prepreg sheet, followed by lamination at high temperature, high pressure and vacuum conditions; during the process, the laminated prepreg sheet is cured to become the insulating layer in the copper clad laminate. Generally, the prepreg sheet, i.e. the cut prepreg, is formed by impregnating a glass fabric with a resin composition, baking and other processes.

According to the conventional practice, a prepreg is cut into a plurality of prepreg sheets which are stacked and stored in a warehouse waiting for further processing. When there is a need for producing copper clad laminates, those prepreg sheets are retrieved from the warehouse and subject to a sheet separation process performed by operators manually. The sheet separation operation involves separating multiple independent prepreg sheets from the stack such that these prepreg sheets can be assembled with copper foils to form an assembly, which is then subject to a lamination process to make a copper clad laminate. However, there are several drawbacks in the aforesaid conventional practice, including for example: (1) during the sheet separation operation, electrostatic charges may be formed between prepreg sheets in the stack, increasing the risk of damage or breakage of the prepreg sheets during the sheet separation operation and lowering the overall productivity and yield of the copper clad laminates; in particular, the damage or breakage risk becomes higher when the thickness of each prepreg sheet is reduced, such as using thinner fiberglass fabrics; (2) the sheet separation operation is performed manually, which is time-consuming and labor-consuming; and (3) a warehouse is needed to store the prepreg sheets, and a process is needed for retrieving the prepreg sheets from the warehouse.

To improve the efficiency, a cutting machine has been proposed, which can, after the prepreg has been cut into prepreg sheets, synchronously stack the prepreg sheets; however, during the operation, due to the possibility of copper foil contamination by fallen powder or dust produced during the prepreg sheet cutting process, the cutting machine only performs cutting and stacking operations, and the process for assembling prepreg sheets and copper foils is not performed by the cutting machine.

In view of the foregoing, the present disclosure provides an assembly arrangement system and an assembly manufacturing method to address the drawbacks in prior technology.

SUMMARY OF THE INVENTION

It is an object of the present disclosure to provide an assembly arrangement system, comprising a feeding unit, a conveyor unit and an assembling unit, wherein the feeding unit cuts a prepreg to form a prepreg sheet which is then conveyed by the conveyor unit directly to the assembling unit, and the assembling unit assembles a plate, a metal foil and the prepreg sheet; during the process, the prepreg sheet does not need to be stored or subject to a sheet separation operation.

It is another object of the present disclosure to provide an assembly arrangement system, which uses a heating unit to heat a portion of the prepreg and form a softened portion. As such, the prepreg is cut at the softened portion to prevent or eliminate debris generation during the cutting process of the prepreg.

It is still another object of the present disclosure to provide an assembly arrangement system, which uses a controller, according to a synchronization process, to control the feeding unit, the conveyor unit and/or the assembling unit, such that the plate, the metal foil and the prepreg sheet are assembled synchronously at the assembling unit.

It is yet another object of the present disclosure to provide an assembly manufacturing method; prior to assembling the plate, the metal foil and the prepreg sheet, a first parameter associated to the feeding unit, a second parameter associated to the conveyor unit, and a third and a fourth parameter associated to the assembling unit are set or adjusted, so as to enable the second assembling part of the assembling unit to synchronously assemble the plate, the metal foil and the prepreg sheet.

It is yet another object of the present disclosure to provide an assembly manufacturing method, wherein the metal foil and the plate are superimposed prior to the assembling step to increase the assembling efficiency.

To achieve these and other objects, the present disclosure provides an assembly arrangement system, comprising a feeding unit, a conveyor unit and an assembling unit. The feeding unit comprises a supplying part and a cutting part. The supplying part is provided with a prepreg and configured to supply the prepreg to the cutting part. The cutting part cuts the prepreg to continuously form one or more prepreg sheets. The conveyor unit receives and conveys the prepreg sheet(s). The assembling unit comprises a metal foil supplying part, a first assembling part and a second assembling part. The second assembling part assembles a plate and a metal foil from the metal foil supplying part with the prepreg sheet(s) from the conveyor unit into an assembly. The first assembling part bears the assembly. In addition, the assembling unit can continuously assemble at least one assembly into multiple assemblies, such as five assemblies, six assemblies, eight assemblies or ten assemblies. In other words, the number of assembly to be processed or assembled by the assembling unit is not particularly limited.

The metal foil supplying part selectively superimposes at least one metal foil and a plate to form a copper foil set; for example, without limitation, the metal foil supplying part superimposes one metal foil and one plate to form a copper foil set with a structural configuration of "metal foil-plate"; alternatively, the metal foil supplying part may superimpose two metal foils and one plate to form a copper foil set with a structural configuration of "metal foil-plate-metal foil".

The prepreg may be configured as a roll or an elongated sheet. Said roll of prepreg refers to a prepreg processed and rolled by a rolling machine into a roll after the prepreg is formed by subjecting a fiberglass fabric to impregnation of a resin composition and baking.

Said elongated sheet of prepreg refers to the prepreg directly outputted after it has been produced by subjecting a fiberglass fabric to impregnation of a resin composition and baking. Different from the prepreg roll, the elongated sheet of prepreg is not rolled by a rolling machine.

The metal foil may comprise, without limitation, a copper foil, a copper alloy foil or the like. The metal foil, depending on the manufacturing method used but without limitation, may be an electrodeposited copper foil or a rolled annealed copper foil. In addition, according to the roughness, the metal foil can be categorized into, for example, high temperature elongation (HTE) copper foil, reverse treated foil (RTF) copper foil, very low profile (VLP) copper foil, and hyper very low profile (HVLP) copper foil. The metal foil, depending on the thickness of copper foil for example, can be a carrier-attached copper foil (i.e., a copper foil with a carrier) or a carrier-free copper foil.

The plate may comprise for example a steel plate, a stainless steel plate, an alloy steel plate or preferably a mirror finished stainless steel plate.

The assembling unit may have one or more second assembling parts. For example, the second assembling part may consist of two suction cranes, wherein one suction crane moves the prepreg sheet from the conveyor unit to the first assembling part of the assembling unit, and the other suction crane moves the copper foil set from the metal foil supplying part of the assembling unit to the first assembling part of the assembling unit. In another embodiment, the second assembling part may consist of three suction cranes, such as a first suction crane, a second suction crane and a third suction crane. The first suction crane moves the prepreg sheet from the conveyor unit to the first assembling part of the assembling unit, the second suction crane moves the metal foil or plate to the metal foil supplying part of the assembling unit to form the copper foil set, and the third suction crane moves the copper foil set from the metal foil supplying part of the assembling unit to the first assembling part of the assembling unit. Preferably, the second assembling part comprises a plurality of suction cranes for respectively moving and assembling the prepreg sheet and the copper foil set or for moving and assembling the prepreg sheet, the metal foil or the plate. The suction cranes may suck and suspend the prepreg sheet, the metal foil or the plate by vacuum means or other means.

To achieve these and other objects, the present disclosure provides an assembly arrangement system, comprising a feeding unit, a conveyor unit, an assembling unit and a controller. The feeding unit may cut a prepreg provided thereto and continuously form one or more prepreg sheet(s). The conveyor unit receives and conveys the prepreg sheet. The assembling unit comprises a metal foil supplying part, a first assembling part and a second assembling part. The second assembling part assembles a plate and a metal foil provided by the metal foil supplying part with the prepreg sheet from the conveyor unit, so as to form an assembly at the first assembling part. The controller is connected with at least one of the feeding unit, the conveyor unit and the assembling unit, wherein the feeding unit is configured with a first parameter, the conveyor unit is configured with a second parameter, the first assembling part and the second assembling part of the assembling unit are configured with a third parameter, the metal foil supplying part of the assembling unit is configured with a fourth parameter, wherein the first parameter, the second parameter, the third parameter and the fourth parameter are individually selected from at least one of time, speed and distance and are set according to a formula, such that the controller controls at least one of the feeding unit, the conveyor unit and the assembling unit according to the formula to enable the first assembling part and the second assembling part to synchronously assemble the plate, the metal foil and the prepreg sheet into the assembly.

To achieve these and other objects, the present disclosure provides an assembly manufacturing method, comprising the following steps: S1: providing a prepreg; S2: cutting the prepreg into a prepreg sheet according to a first parameter; S3: conveying the prepreg sheet to an assembly arrangement area according to a second parameter; and S4: assembling a copper foil set and the prepreg sheet according to a third parameter to form an assembly, wherein the copper foil set is formed by superimposing at least one metal foil and a plate according to a fourth parameter. In addition, at least one of the first parameter, the second parameter, the third parameter and the fourth parameter is such set that the copper foil set and the prepreg sheet are provided to the assembly arrangement area before being assembled and are synchronously assembled in the assembly arrangement area into the assembly.

The assembly thus arranged may be further subject to a lamination process at high temperature, high pressure and vacuum conditions by a lamination system so as to cure the prepreg sheet to a C-stage to serve as an insulating layer between two metal foils, thereby forming a metal clad laminate with a configuration of metal foil-cured prepreg sheet-metal foil, such as a copper clad laminate. It should be noted that the plate may be removed and recycled for repeated use in the next assembly arrangement process.

Compared with prior technology, the assembly arrangement system and its manufacturing method of the present disclosure may cut a prepreg to continuously form one or more prepreg sheets which may then be transferred directly to the assembling unit; after receiving the metal foil and the plate, the assembling unit assembles the plate, the metal foil and the prepreg sheet directly into an assembly, overcoming the inconvenience and disadvantages of the prior technology where prepreg sheets are stacked, stored, and separated before they can be used to form the assembly. Therefore, the present disclosure may effectively increase the process yield and production rate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
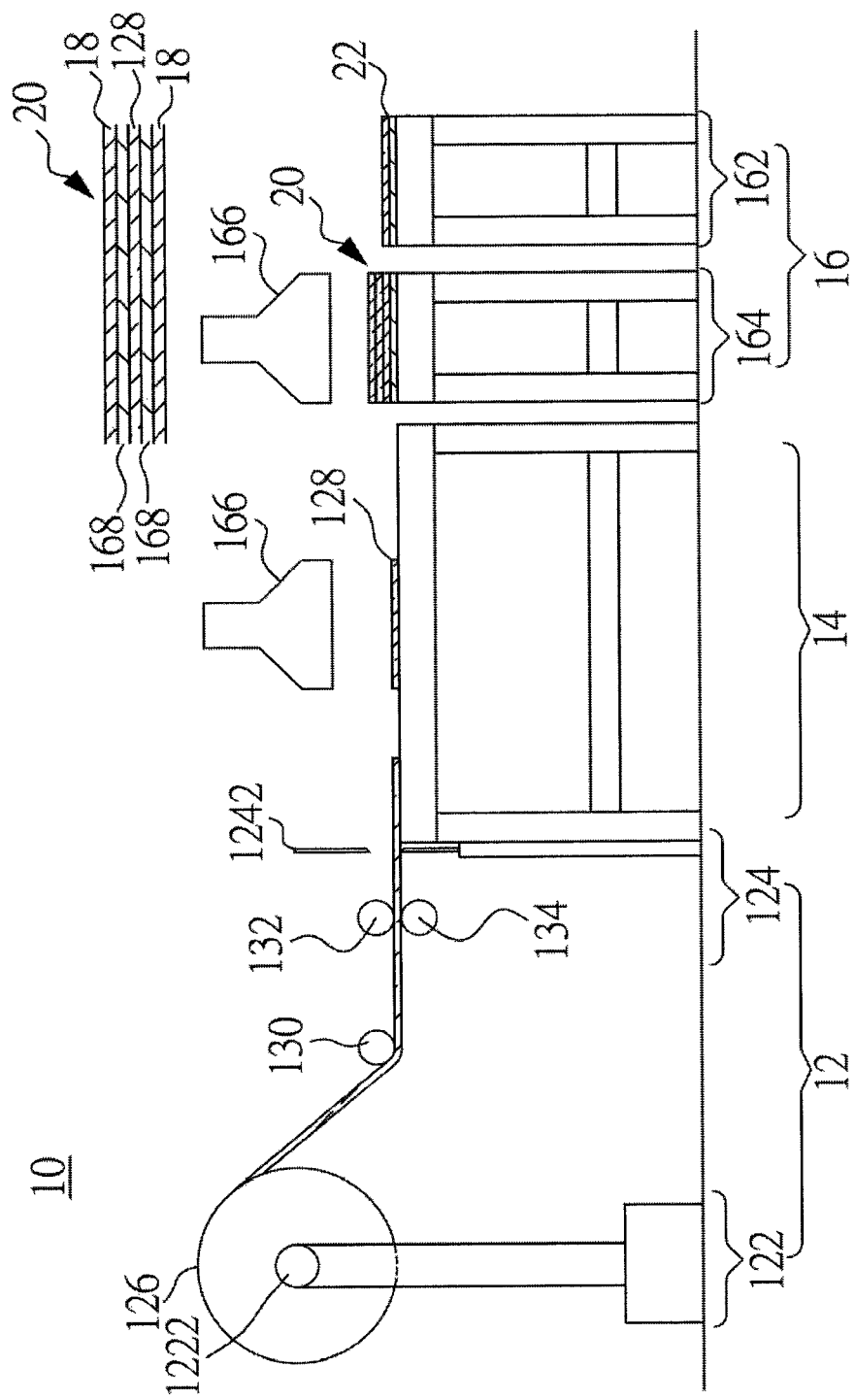
FIG. 1 illustrates the configuration of an assembly arrangement system according to a first embodiment of the present disclosure.

To enable those skilled in the art to further appreciate the objects, features and effects of the present disclosure, the following embodiments and examples are described in detail in conjunction with the accompanying drawings.

As used herein, the use of "a," "an" or similar expression is employed to describe units, elements and components described herein. This is done merely for convenience and to give a general sense of the scope of the present disclosure. Accordingly, this description should be read to include one or at least one and the singular also includes the plural unless it is obvious to mean otherwise.

As used herein, the term "synchronous" or its variant is used to describe, without limitation, that in a system, parameters of multiple parts or components are adjusted or set to enable continuous or simultaneous operations of one or more parts or components. For example, a system may comprise a first component and a second component respectively complying with different specifications or criteria. The first criterion is that the first component consumes a first time, which may represent one aforesaid parameter, to perform a first operation, and the first time is shorter than a second time, which may represent one aforesaid parameter, consumed by the second component to perform a second operation; in other words, the first component completes the first action within a duration shorter than that required by the second component to complete the second action. The second criterion is that the completion of the first operation by the first component is a prerequisite of the completion of the second operation by the second component. Therefore, when the first component completes the first operation, the result of the first operation can be timely provided to the second component, such that the first component is not idle when the second component performs the second operation. If the above-describe idling of components does not occur or is not significant, it is said that the first component and the second component are synchronously operated. As described above, "performs an operation" refers to carrying out the operation lastingly, and "completion" refers to the termination of the operation.

As used herein, the term "comprises," "comprising," "includes," "including," "has," "having" or any other variant thereof is construed as an open-ended transitional phrase intended to cover a non-exclusive inclusion. For example, a component, structure, manufacture or device that comprises a list of elements is not necessarily limited to only those elements but may include other elements not expressly listed or inherent to such component, structure, manufacture or device. Further, unless expressly stated to the contrary, the term "or" refers to an inclusive or and not to an exclusive or.

As used herein, the term "step" or its variant is used to describe the process of a method. This is merely for convenience and brevity. Therefore, unless otherwise specified, one or more "steps" should not necessarily be interpreted as containing any causality. For example, if a method comprises step S1 and step S2, given the intended purposes and advantages of this disclosure are achieved, step S1 may take place before or after step S2, or step S1 and step S2 may take place at the same time.

FIG. 1 illustrates the configuration of an assembly arrangement system according to a first embodiment of the present disclosure. In this embodiment, the assembly arrangement system 10 comprises a feeding unit 12, a conveyor unit 14 and an assembling unit 16.

The feeding unit 12 comprises a supplying part 122 and a cutting part 124.

The supplying part 122 may be configured as a feeding shaft 1222, which is provided with a roll of prepreg 126. In this embodiment, the prepreg 126 is made by impregnating a substrate, such as a fiberglass fabric, in a resin composition and then baking it to a semi-cured state, also known as the "B-stage." The resin composition may comprise but not limited to epoxy resin, curing agent and inorganic filler, or the resin composition may comprise maleimide, cyanate ester resin, polyphenylene ether or its crosslinking agent. Briefly speaking, the resin composition may be any known or novel resin composition.

The cutting part 124 provides one cutter or a plurality of cutters. In one embodiment, the cutting part 124 provides two cutters 1242 having blades arranged opposite to each other and spaced apart from each other by a distance to allow passage of the prepreg 126; when at least one blade of the two cutters 1242 is moved, the prepreg 126 is cut by the blades and separated or released from the feeding shaft 1222 to form a prepreg sheet 128. Continuous operation of the two cutters 1242 may cut the prepreg 126 to continuously form a prepreg sheet 128.

In another embodiment, the assembly arrangement system 10 may be provided with a heating unit 15 such as arranged in front of the cutting part 124. The heating unit 15 may heat a portion of the prepreg 126 so as to form a softened portion. When the cutting part 124 cuts the prepreg 126 at the softened portion, debris falling from the prepreg 126 can be avoided during the cutting process, so as to prevent impurities from influencing the subsequent processes. Preferably, the heating unit 15 only heats the prepreg 126 at the area to be cut and no other areas.

In addition, the prepreg 126 between the supplying part 122 and the cutting part 124 can be further manipulated by a plurality of rollers 130, 132, 134 to adjust the tension of the prepreg 126 and convey the prepreg 126.

Figure 2:
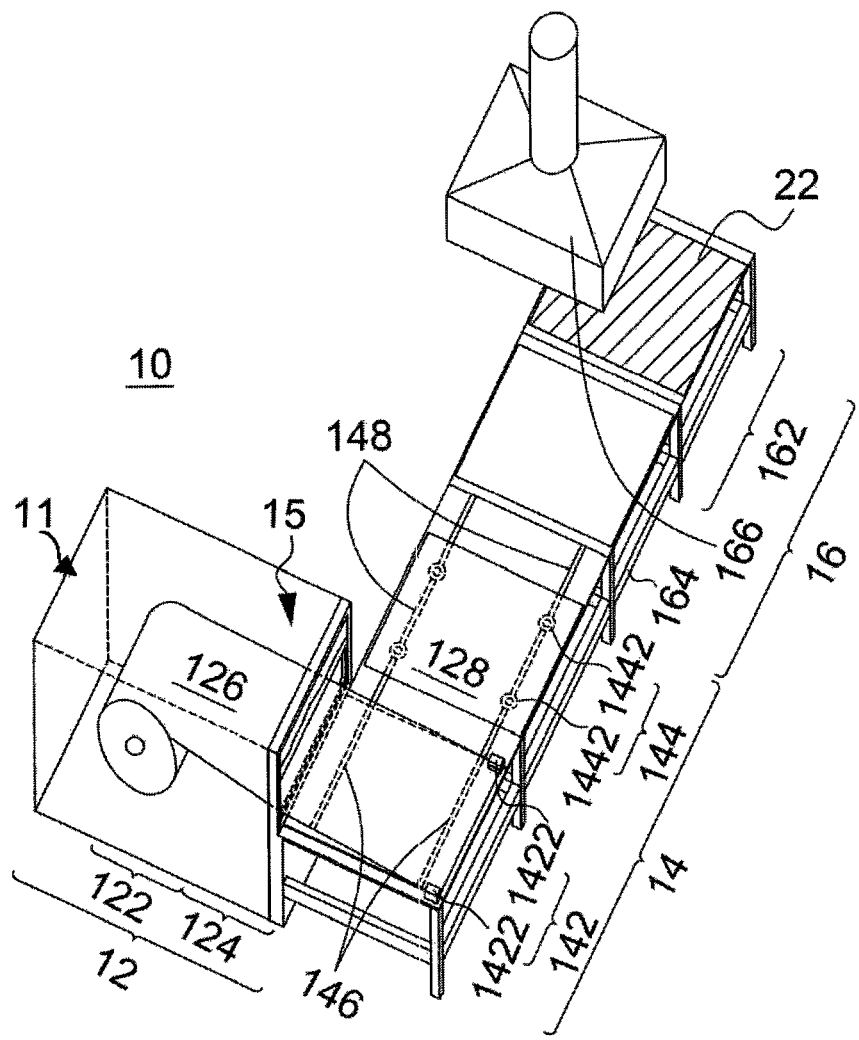
FIG. 2 illustrates a three-dimensional view of the assembly arrangement system of FIG. 1.

The conveyor unit 14 receives the prepreg sheet 128 from the feeding unit 12 and conveys the prepreg sheet 128 to the assembling unit 16. Refer now to FIG. 2, which illustrates a three-dimensional view of the assembly arrangement system of FIG. 1. In this embodiment, the conveyor unit 14 comprises a first pickup part 142, a second pickup part 144, a first track part 146 and a second track part 148. The first pickup part 142 pulls out, by clamping, the prepreg 126 from the cutting part 124 along the first track part 146. During the process of the first pickup part 142 pulling the prepreg 126, a tension maintained between the supplying part 122 and the first pickup part 142 ensures the smoothness and flatness of the prepreg 126 such that the cutting part 124 may cut to form a smooth and flat prepreg sheet 128. Next, the second pickup part 144 may vacuum-suck the prepreg sheet 128 and move the prepreg sheet 128 along the second track part 148 toward the assembling unit 16. Herein, the first pickup part 142 comprises two first pickup mechanisms 1422 to perform the clamping operation on the prepreg sheet 128, and the second pickup part 144 comprises two second pickup mechanisms 1442 to perform the vacuum-sucking operation on the prepreg sheet 128. For brevity and conciseness, this embodiment uses two first pickup mechanisms 1422 and two second pickup mechanisms 1442 as the example. However, in other embodiments, the amount of the first pickup mechanism 1422 or second pickup mechanism 1442 may be one, two or more than two. In addition, the first pickup mechanism 1422, in addition to clamping operation, may also use other operations to pick up the prepreg sheet 128, such as by magnetically sucking or vacuum-picking, and the second pickup mechanism 1442 may similarly use other operations as above.

Refer to both FIG. 1 and FIG. 2, wherein the assembling unit 16 comprises a metal foil supplying part 162, a first assembling part 164 and a second assembling part 166. In this embodiment, the metal foil 168 and the plate 18 have been already assembled as a copper foil set 22. In other words, the copper foil set 22 consists of the metal foil 168 and the plate 18. The second assembling part 166 assembles the copper foil set 22 from the metal foil supplying part 162 and the prepreg sheet 128 from the conveyor unit 14 at the first assembling part 164 into the assembly 20. The plate 18 may be a steel plate. In another embodiment, the second assembling part 166 assembles one plate 18 and one metal foil 168 from the metal foil supplying part 162 with the prepreg sheet 128 from the conveyor unit 14 into the assembly 20, and the first assembling part 164 bears the assembly 20.

In this embodiment, arranged on the first assembling part 164 are, in the order specified, the plate 18, the metal foil 168, at least one prepreg sheet 128, the metal foil 168 and the plate 18, thereby forming the assembly 20, which may be observed from the partially enlarged view in FIG. 1. In addition, to precisely place the prepreg sheet 128 at a superimposition position (not shown) of the first assembling part 164, the first pickup part 142 may position the prepreg sheet 128 at a predetermined position (not shown) of the first track part 146 in advance, such that the prepreg sheet 128 is moved from the predetermined position along the second track part 148 toward the assembling unit 16, so as to correspondingly set the prepreg sheet 128 relative to the superimposition position of the first assembling part 164. In another embodiment, multiple independent prepreg sheets 128 can be stacked at the superimposition position in a staggered manner by varying the configuration of the predetermined position.

Figure 3:
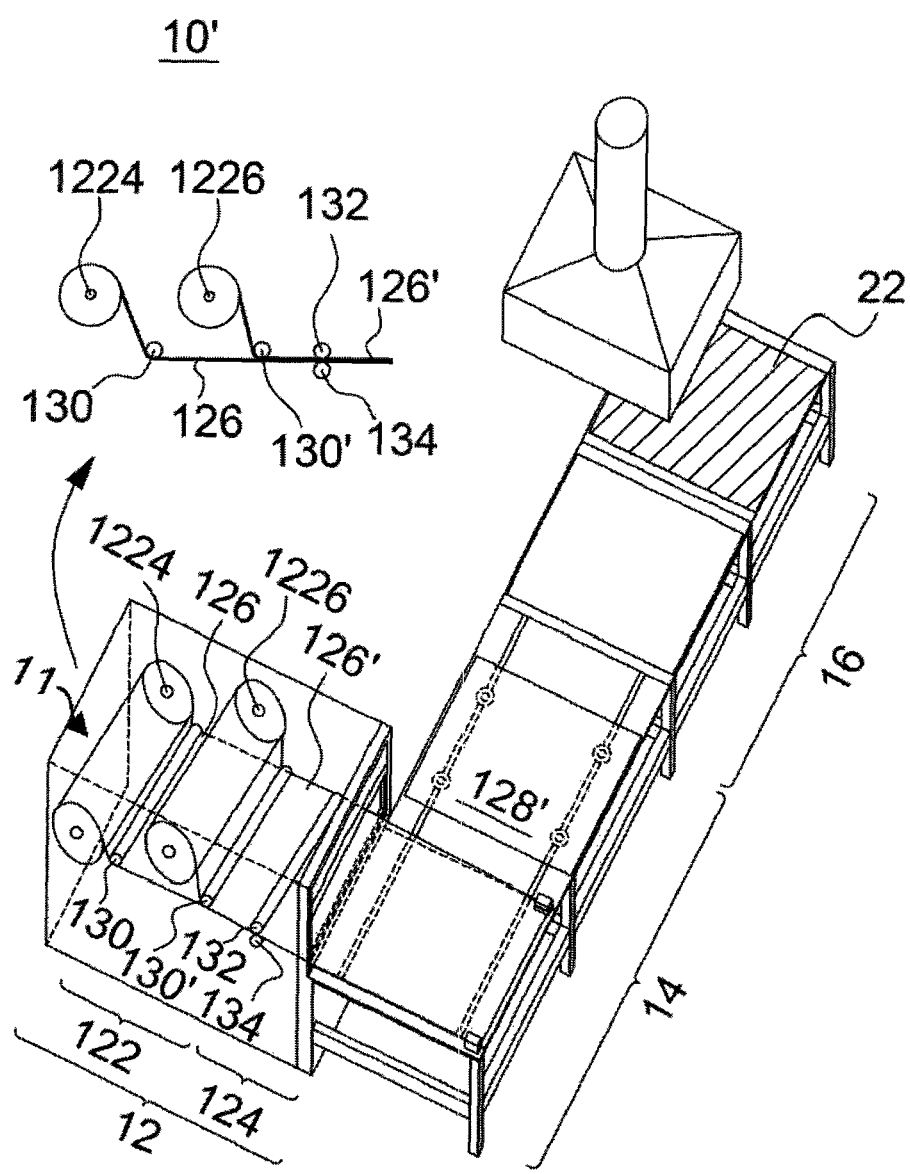
FIG. 3 illustrates a three-dimensional view of the assembly arrangement system according to a second embodiment of the present disclosure.

FIG. 3 illustrates a three-dimensional view of the assembly arrangement system according to a second embodiment of the present disclosure. The assembly arrangement system 10' comprises, as in the first embodiment, a feeding unit 12, a conveyor unit 14 and an assembling unit 16. Different from the first embodiment, herein the supplying part 122 comprises two feeding shafts 1224, 1226. The feeding shaft 1224 is provided with a roll of prepreg 126, and the feeding shaft 1226 is provided with a roll of prepreg 126'. In this embodiment, two feeding shafts 1224, 1226 are illustrated; however, in other embodiments, the number of feeding shaft is not limited to two. As shown in FIG. 3, the prepreg 126 is in contact with the lower side of the roller 130, and the prepreg 126' is in contact with the lower side of the roller 130', such that the upper surface of the prepreg 126 is opposite to the lower surface of the prepreg 126'. Next, a two-layer prepreg consisting of the prepreg 126 and the prepreg 126' is transferred by the rollers 132, 134 to the conveyor unit 14. The prepreg 126 and the prepreg 126' are, via the tension applied by the rollers 130, 130', 132, 134, maintained as a flat and smooth two-layer prepreg. It should be noted that, to face the upper surface of the prepreg 126 to the lower surface of the prepreg 126', in addition to contacting the prepregs 126, 126' to the lower side of the rollers 130, 130', the prepregs 126, 126' may also be in contact with the upper side of the rollers 130, 130', or one of the prepregs is in contact with the upper side of the rollers 130, 130', while the other one of the prepregs is in contact with the lower side of the rollers 130, 130'. Preferably, the prepregs 126, 126' are both in contact with the upper side or lower side of the rollers 130, 130' at the same time to maintain the two-layer prepreg at a flatter and smoother state.

The cutting part 124 may simultaneously cut two prepregs 126, 126' (i.e., the aforesaid two-layer prepreg) to form a plurality of layers of prepreg sheet 128'. The plurality of layers of prepreg sheet 128' can be conveyed by the conveyor unit 14 toward the assembling unit 16 and stacked on the plate 18 and the metal foil 168 at the first assembling part.

In another embodiment, the assembly arrangement system 10' may be provided with a heating unit for heating the two prepregs 126, 126' and forming a partially softened portion (not shown) therein. In addition to the advantage as described in the first embodiment of preventing debris and fallen powder by cutting the prepregs 126, 126' at the softened portions, in this embodiment, two prepregs 126, 126' can be partially melted together and connected to facilitate the cutting part 124 to simultaneously cut two prepregs 126, 126'.

Figure 4:
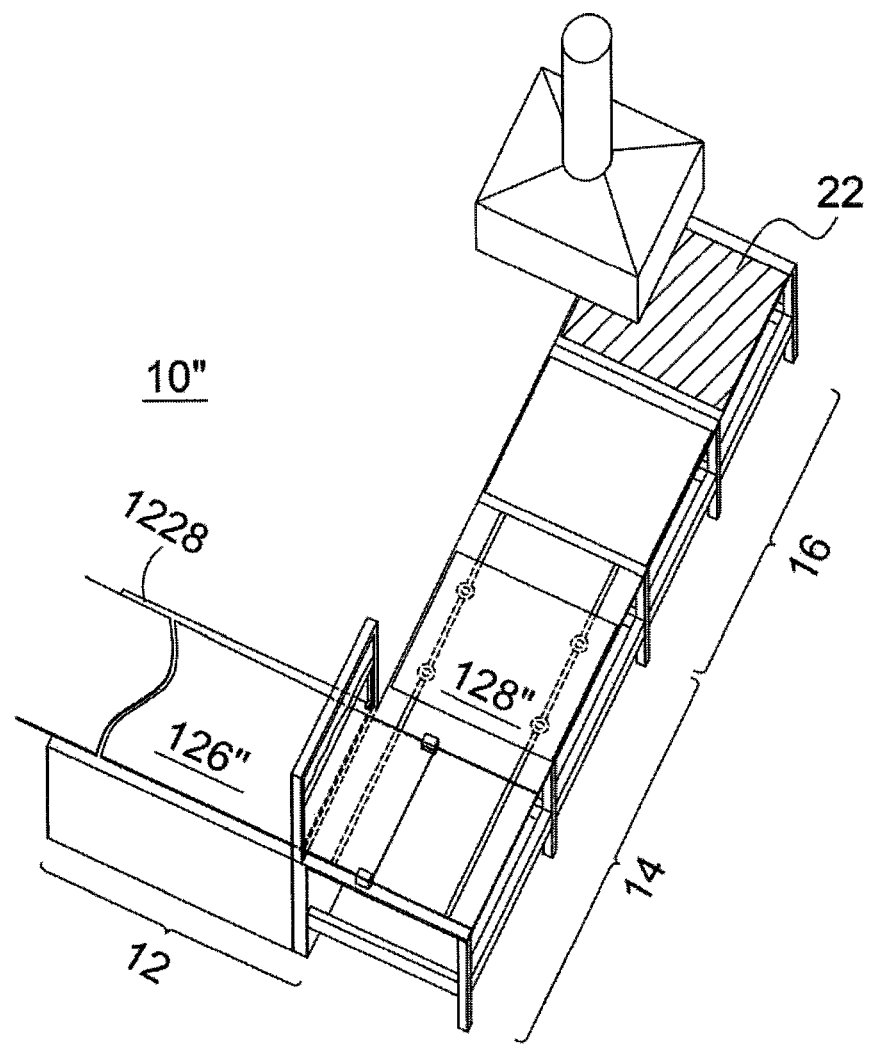
FIG. 4 illustrates a three-dimensional view of the assembly arrangement system according to a third embodiment of the present disclosure.

FIG. 4 illustrates a three-dimensional view of the assembly arrangement system according to a third embodiment of the present disclosure. In this embodiment, the assembly arrangement system 10" comprises, as in the first embodiment, a feeding unit 12, a conveyor unit 14 and an assembling unit 16; unlike the first embodiment, in this embodiment the supplying part 122 is configured as a feeding platform 1228. The feeding platform 1228 provides a continuous elongated sheet-like prepreg 126". In FIG. 4, the elongated sheet-like prepreg 126" represents a prepreg outputted after it has been impregnated and then baked.

The elongated sheet-like prepreg 126" may be cut by the cutting part 124 to continuously form a plurality of prepreg sheets 128". In this embodiment, the prepreg sheets 128" are conveyed by the conveyor unit 14 to the assembling unit 16.

From the first embodiment to the third embodiment, the assembly arrangement system 10, 10', 10" may further comprise a controller 11. The controller 11 may be connected to at least one of the feeding unit 12, the conveyor unit 14 and the assembling unit 16. For example, as shown in FIG. 2, the controller 11 may, according to a synchronization process, operate the feeding unit 12, the conveyor unit 14, and/or the assembling unit 16. The controller 11 may configure a first parameter P1 in the feeding unit 12, configure a second parameter P2 in the conveyor unit 14, and configure a third parameter P3 in the first assembling unit 164 and the second assembling unit 166 of the assembling unit 16, wherein the first parameter P1, the second parameter P2 and the third parameter P3 may be selected from at least one of time, speed and distance. The purpose of the synchronization process is to enable the plate 18, the metal foil 168 and the prepreg sheet 128 to be timely provided to the first assembling part 164 before the first assembling part 164 performs the assembling operation and to use the second assembling part 166 to synchronously assemble the plate 18, the metal foil 168 and the prepreg sheet 128 into the assembly 20, which is supported and borne by the first assembling part 164. In this embodiment, the metal foil 168 and the plate 18 can be independently and timely provided to the first assembling part 164, or the metal foil 168 and the plate 18 can be superimposed in advance as a copper foil set 22 to enable the metal foil 168 and the plate 18 to be provided together timely to the first assembling part 164. It should be noted that, the metal foil supplying part 162 may further be configured with a fourth parameter P4 for superimposing the metal foil 168 and the plate 18 as a copper foil set 22. Herein, a single metal foil 168 superimposed with a single plate 18 is used as the example. In other embodiments, the copper foil set 22 may be a multi-layer structure, such as having the configuration of, from bottom to top, metal foil-plate-metal foil, plate-metal foil, metal foil-plate or similar structures.

For example, each parameter P1, P2, P3, P4 can be associated with time, such that the parameters may be defined as below in the implementation of the system: the first parameter P1 representing the time consumed by the feeding unit 12 for feeding, cutting and forming prepreg sheet(s) 128, such as the time may be 7 to 13 (second/sheet); the second parameter P2 representing the time consumed by the conveyor unit 14 for receiving and conveying the prepreg sheet(s) 128, such as the time may be 6 to 12 (second/sheet); the third parameter P3 representing the time consumed by the second assembling part 166 for assembling the copper foil set 22, consisting of the metal foil 168 superimposed with the plate 18, with the prepreg sheet(s) 128 into the assembly 20 and the first assembling part 164 for bearing the assembly 20, such as the time may be 8 to 14 (second/set); and the fourth parameter P4 representing the time consumed by the metal foil supplying part 162 for superimposing the metal foil 168 and the plate 18 to form the copper foil set 22.

Given that the third parameter P3 is set by the controller as 12.3 (second/set), then the first parameter P1, the second parameter P2 and the fourth parameter P4 can be configured in correspondence to the third parameter P3 as follows: the first parameter P1 is set by the controller as 11.9 (second/sheet), the second parameter P2 is set by the controller as 8.9 (second/sheet) and the fourth parameter P4 is set by the controller as being less than the third parameter P3. When the assembly arrangement system 10 begins to operate, the second assembling part 166 spends 12.3 seconds to assemble a first copper foil set, having for example a structure of plate-metal foil, and a first prepreg sheet into a first assembly (in another embodiment, said first assembly can be referred to as a former assembled assembly or anterior assembly), and the first assembly is borne at the first assembling part 164. During the operation of the second assembling part 166, the conveyor unit 14 spends 8.9 seconds to convey a second prepreg sheet to the first assembling part 164, the feeding unit 12 spends 11.9 seconds to form a third prepreg sheet, the metal foil supplying part 162 spends 12.0 seconds to sequentially superimpose a metal foil, a plate and a metal foil to form a second copper foil set. Next, the second assembling part 166 spends another 12.3 seconds to assemble a second copper foil set, having a structure such as metal foil-plate-metal foil, and a second prepreg sheet into a second assembly (in another embodiment, said second assembly can be referred to as a latter assembled assembly or posterior assembly), wherein the second assembly is located on the first assembly. Similarly, the above-mentioned processes and steps can be used to synchronously complete a third assembly, a fourth assembly, etc. Because the feeding unit 12, the conveyor unit 14 and the metal foil supplying part 162 may complete their respective operations prior to the second assembling part 166 completing the first assembly, after the second assembling part 166 has completed the first assembly, the next assembling operation can be performed timely. Therefore, the assembly arrangement system 10 can be controlled that it finishes an assembly 20 every 12.3 seconds approximately.

From the descriptions above, it can be understood that the feeding unit 12, the conveyor unit 14, the assembling unit 16, and the metal foil supplying part 162 may be configured or associated according to a formula. The formula may be an inequality, a relation, a mathematic operation or the like. For example, if the formula is an inequality, the parameters P1, P2, P3, P4 may be associated by any mathematic symbol such as greater than ($>$), less than ($<$), equal to ($=$), not equal to ($\neq$), greater than or equal to ($\geq$), less than or equal to ($\leq$), approximately equal to ($\approx$) and so on. If the formula represents a mathematic relation, the parameters P1, P2, P3, P4 may be associated by any mathematic operation ($+$, $-$, $\times$, $\div$). For example, in an assembly arrangement system, to achieve the purpose of synchronization, each unit preferably meets a specific formula and correlates one another. For example, the time consumed by each unit in one embodiment is in compliance with the following relationship: time required by the conveyor unit 14 to complete its operation<time required by the feeding unit 12 to complete its operation<time required by the first assembling part 164 and the second assembling part 166 of the assembling unit 16 to complete their respective operations and time required by the metal foil supplying part 162 of the assembling unit 16 to complete its operation<time required by the first assembling part 164 and the second assembling part 166 of the assembling unit 16 to complete their respective operations. Suppose the formula above is valid, it can be understood that when the second assembling part 166 of the assembling unit 16 is assembling the anterior assembly (a.k.a. the first assembly or the former assembled assembly), the feeding unit 12, the conveyor unit 14 and the metal foil supplying part 162 may all complete their respective operations, and when the second assembling part 166 of the assembling unit 16 has completed the anterior assembly, the conveyor unit 14 and the metal foil supplying part 162 can both timely provide thereto the metal foil 168, the plate 18 and the prepreg sheet 128, such that the second assembling part 166 of the assembling unit 16 can proceed with the next assembling operation without delay.

Figure 5:
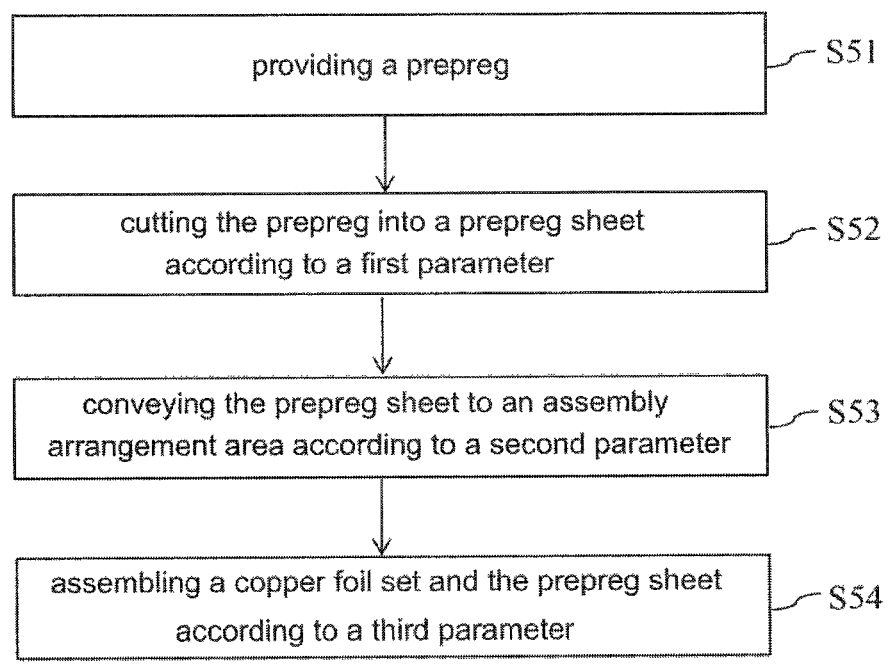
FIG. 5 illustrates a flowchart of the assembly manufacturing method according to a fourth embodiment of the present disclosure.

FIG. 5 illustrates a flowchart of the assembly manufacturing method according to a fourth embodiment of the present disclosure. As shown in this embodiment, the assembly manufacturing method begins with step S51, which involves providing a prepreg.

Step S52 involves cutting the prepreg into a prepreg sheet according to a first parameter; the first parameter may be for example 7 to 13 (second/sheet).

Step S53 involves conveying the prepreg sheet to an assembly arrangement area according to a second parameter; the second parameter may be for example 6 to 12 (second/sheet).

Step S54 involves assembling a copper foil set and the prepreg sheet to form an assembly according to a third parameter; the third parameter may be for example 8 to 14 (second/set). In some embodiments, the assembly may be a combination of a single copper foil set and a prepreg sheet, or it may be a combination of multiple assemblies. For example, the assembly may have any one of the following configurations, from bottom to top: plate-metal foil-prepreg sheet-metal foil-plate-metal foil-prepreg sheet-metal foil-plate, plate-metal foil-prepreg sheet-prepreg sheet-metal foil-plate-metal foil-prepreg sheet-prepreg sheet-metal foil-plate-metal foil-prepreg sheet-prepreg sheet-metal foil-plate, and any variation thereof. In other embodiments, the prepreg sheet may be configured as a single piece or a stack of multiple pieces. For example, the assembly may have the following configuration, from bottom to top: plate-metal foil-prepreg sheet-prepreg sheet-prepreg sheet-metal foil-plate-metal foil-prepreg sheet-prepreg sheet-prepreg sheet-metal foil-plate-metal foil-prepreg sheet-prepreg sheet-prepreg sheet-metal foil-plate.

In addition, according to the fourth parameter, the metal foil and the plate can be superimposed to form the copper foil set. For example, the copper foil set may have any one of the following configurations, from bottom to top: metal foil-plate-metal foil, plate-metal foil, metal foil-plate and so on. The fourth parameter may be for example 8 to 14 (second/set), which is less than the third parameter.

From steps S52 to S54, by adjusting at least one of the first parameter, the second parameter, the third parameter and the fourth parameter, the copper foil set and the prepreg sheet can be timely provided to the assembly arrangement area before being assembled and can be synchronously assembled in the assembly arrangement area into an assembly.

In another embodiment, step S52 further comprises heating a part of the prepreg to form a softened portion and cutting the prepreg at the softened portion to form the prepreg sheet.

In another embodiment, step S53 further comprises placing the prepreg sheet to a predetermined position to correspond the prepreg sheet to a superimposition position of the assembly arrangement area. In this step, the superimposition position is located in the assembly arrangement area. In the process of conveying the prepreg sheet to the assembly arrangement area, the prepreg sheet may be configured in advance relative to the superimposition position so as to precisely convey the prepreg sheet to the superimposition position or to stack multiple single prepreg sheets at the superimposition position in a staggered manner.

While at least one exemplary embodiment has been presented in the foregoing detailed description, those skilled in the art appreciate that one or more embodiments are intended to describe the invention but not intended to limit the scope of the claimed subject matter in any way. The scope defined by the claims includes known equivalents and foreseeable equivalents at the time of filing this patent application.

What is claimed is:

1. An assembly arrangement system, comprising:
a feeding unit comprising a supplying part and a cutting part, wherein the supplying part is provided with a prepreg and configured to supply the prepreg to the cutting part, and the cutting part cuts the prepreg to continuously form a prepreg sheet;
a conveyor unit receiving and conveying the prepreg sheet, wherein the conveyor unit comprises a pickup part and a track part, the pickup part picking up the prepreg sheet from the track part and moving the prepreg sheet to an assembling unit; and
the assembling unit comprising a metal foil supplying part, a first assembling part and a second assembling part, the second assembling part assembling synchronously a provided plate and a metal foil from the metal foil supplying part with the prepreg sheet from the conveyor unit into an assembly, and the first assembling part bearing the assembly, wherein the provided plate is a steel plate, a stainless steel plate, an alloy steel plate or a combination thereof.

2. The assembly arrangement system of claim 1, wherein the pickup part positions the prepreg sheet at a predetermined position of the track part in correspondence to a superimposition position of the first assembling part.

3. The assembly arrangement system of claim 1, wherein the pickup part comprises a pickup mechanism configured to perform a clamping operation on the prepreg sheet.

4. The assembly arrangement system of claim 1, further comprising a controller connected with at least one of the feeding unit, the conveyor unit and the assembling unit, the controller operating at least one of the feeding unit, the conveyor unit and the assembling unit according to a synchronization process to enable the provided plate, the metal foil and the prepreg sheet are synchronously provided to the first assembling part.

5. The assembly arrangement system of claim 4, wherein the controller enables the feeding unit to form the prepreg sheet according to a first parameter set in the feeding unit by the controller, enables the conveyor unit to convey the prepreg sheet according to a second parameter set in the conveyor unit by the controller, and enables the first assembling part and the second assembling part to assemble the provided plate, the metal foil and the prepreg sheet into the assembly according to a third parameter set in the first assembling part and the second assembling part by the controller, wherein the first parameter, the second parameter and the third parameter are selected from at least one of time, speed and distance.

6. The assembly arrangement system of claim 5, wherein the metal foil supplying part superimposes the metal foil and the provided plate according to a fourth parameter set in the metal foil supplying part by the controller.

7. An assembly arrangement system, comprising:
a feeding unit provided with a prepreg and cutting the prepreg to continuously form a prepreg sheet;
a conveyor unit for receiving and conveying the prepreg sheet;
an assembling unit comprising a metal foil supplying part, a first assembling part and a second assembling part, the second assembling part assembling synchronously a provided plate and a metal foil from the metal foil supplying part with the prepreg sheet from the conveyor unit to form an assembly at the first assembling part, wherein the plate is a steel plate, a stainless steel plate, an alloy steel plate or a combination thereof; and
a controller connected with at least one of the feeding unit, the conveyor unit and the assembling unit;
wherein the feeding unit includes a first parameter, the conveyor unit includes a second parameter, the first assembling part and the second assembling part of the assembling unit include a third parameter, and the metal foil supplying part of the assembling unit includes a fourth parameter, and wherein the first parameter, the second parameter, the third parameter and the fourth parameter are selected from at least one of time, speed and distance or a combination thereof and are set according to a formula, such that the controller controls at least one of the feeding unit, the conveyor unit and the assembling unit according to the formula to enable the first assembling part and the second assembling part to synchronously assemble the provided plate, the metal foil and the prepreg sheet into the assembly.

8. The assembly arrangement system of claim 1, wherein the supplying part is provided with a plurality of prepregs and simultaneously supplies the prepregs to the cutting part, and the cutting part cuts the prepregs to continuously form the prepreg sheet with a plurality of layers.

* * * * *